United States Patent
Abella

(10) Patent No.: US 10,840,794 B2
(45) Date of Patent: Nov. 17, 2020

(54) GRAVITY ENERGY GENERATOR

(71) Applicant: James Abella, Hayward, CA (US)

(72) Inventor: James Abella, Hayward, CA (US)

( * ) Notice: Subject to any disclaimer, the term of this patent is extended or adjusted under 35 U.S.C. 154(b) by 404 days.

(21) Appl. No.: 15/405,013

(22) Filed: Jan. 12, 2017

(65) Prior Publication Data

US 2018/0198336 A1     Jul. 12, 2018

(51) Int. Cl.
*H02K 1/34* (2006.01)
*H02K 1/27* (2006.01)
*H02K 3/28* (2006.01)
*H02K 53/00* (2006.01)
*H02K 35/00* (2006.01)
H02K 7/18 (2006.01)
H02K 35/02 (2006.01)

(52) U.S. Cl.
CPC .......... *H02K 53/00* (2013.01); *H02K 35/00* (2013.01); *H02K 7/1876* (2013.01); *H02K 35/02* (2013.01); *H02K 2203/00* (2013.01); *Y10S 74/09* (2013.01)

(58) Field of Classification Search
CPC ........ H02K 53/00; H02K 35/00; H02K 35/02; H02K 2203/00; H02K 7/1876; Y10S 74/09
USPC .......................................................... 310/152
See application file for complete search history.

(56) References Cited

U.S. PATENT DOCUMENTS

| | | | | |
|---|---|---|---|---|
| 5,473,209 A | * | 12/1995 | Lamb | H02K 49/046 310/156.32 |
| 5,818,132 A | * | 10/1998 | Konotchick | H02K 35/02 310/17 |
| 7,576,454 B2 | * | 8/2009 | Cheung | B82Y 25/00 310/12.12 |
| 9,641,045 B2 | * | 5/2017 | Lewis, Sr. | H02K 7/06 |
| 2002/0175580 A1 | * | 11/2002 | Ogino | H01F 7/06 310/152 |
| 2008/0074083 A1 | * | 3/2008 | Yarger | H01M 6/5033 320/137 |
| 2014/0152134 A1 | * | 6/2014 | Heo | H02K 21/00 310/152 |
| 2014/0339928 A1 | * | 11/2014 | Phillips | F03B 13/16 310/30 |

(Continued)

FOREIGN PATENT DOCUMENTS

KR     100926186 B1 * 11/2009

OTHER PUBLICATIONS

Translation for foreign document KR 100926186 B1 (Year: 2009).*

(Continued)

*Primary Examiner* — Alex W Mok
(74) *Attorney, Agent, or Firm* — The Iwashko Law Firm, PLLC; Lev Ivan Gabriel Iwashko

(57) ABSTRACT

A gravity energy generator that provides a better and efficient way to use electricity as a source of power. The gravity energy generator includes a horizontal casing, a plurality of magnets and a plurality of wiring. A magnet is positioned on a midpoint of a centered shaft that is adapted to rotate along the centered shaft from an electromagnetic field from the first pair of magnets placed on the first end and the second end within the interior of the horizontal casing. Other embodiments of the gravity energy generator include a horizontal casing, a plurality of magnets, a battery and a pair of copper plates as well as a horizontal casing, a plurality of magnets and a pair of magnetic push and pull devices.

4 Claims, 3 Drawing Sheets

(56) References Cited

U.S. PATENT DOCUMENTS

| | | | | |
|---|---|---|---|---|
| 2015/0145258 A1* | 5/2015 | Phillips | .................. | F03B 13/16 |
| | | | | 290/53 |
| 2015/0340940 A1* | 11/2015 | Yen | ........................ | H02K 47/04 |
| | | | | 310/83 |
| 2016/0049832 A1* | 2/2016 | Hill | ........................ | F03D 3/062 |
| | | | | 310/152 |
| 2016/0072373 A1* | 3/2016 | Farquharson | .......... | H02K 7/116 |
| | | | | 310/83 |
| 2016/0134173 A1* | 5/2016 | Deak, Sr. | ............... | H02K 35/02 |
| | | | | 290/1 A |
| 2016/0252071 A1* | 9/2016 | Phillips | .................. | F03B 13/20 |
| | | | | 290/50 |
| 2016/0365759 A1* | 12/2016 | Lin | ........................ | H02K 53/00 |

OTHER PUBLICATIONS

Sears et al., University Physics, Sixth Edition, pp. 349-350. (Date unknown).*

Griffiths, Introduction to Electrodynamics, 1999, pp. 204-207. (Year: 1999).*

* cited by examiner

GRAVITY ENERGY GENERATOR

BACKGROUND OF THE INVENTION

Field of the Invention

The present invention is an energy generator. More specifically, the present invention is a gravity energy generator.

Description of the Related Art

Energy efficiency is an important topic throughout the world. This all must be done within the basic thermodynamic concept of the first law of thermodynamics and the law of conversation of energy. Making electrical generators more efficient and producing more electricity is one of the best direct ways of increasing energy efficiency.

What is needed is a gravity energy generator that is more efficient and produces more electricity as a way of increasing energy efficiency.

SUMMARY OF THE INVENTION

The present invention is an energy generator. More specifically, the present invention is a gravity energy generator.

The gravity energy generator includes a horizontal casing having an interior, a first end and a second end, a plurality of magnets including a first pair of magnets, a second magnet and a third pair of magnets, the first pair of magnets are placed on the first end and the second end within the interior of the horizontal casing, the second magnet is positioned on a midpoint of a centered shaft that is adapted to rotate along the centered shaft from an electromagnetic field from the first pair of magnets placed on the first end and the second end within the interior of the horizontal casing and the first pair of magnets on the first end and the second end within the interior of the horizontal casing that is adapted to be attracted to and is in contact with the third pair of magnets and a plurality of wiring in contact with an electrical contact placed and centered outside of the first end and the second end of the horizontal casing, which is coupled to a third electrical contact, forming a single circuit.

Another embodiment of the gravity energy generator includes a horizontal casing having an interior, a first end and a second end, a plurality of magnets including a first pair of magnets, a second pair of magnets and a third set of magnets, wherein one of the first pair of magnets are each placed on the first end and the second end within the interior of the horizontal casing, wherein one of the second pair of magnets are positioned in front of the first pair of magnets and is adapted to be attracted to the first pair of magnets, a battery positioned between the second pair of magnets, the battery includes a plurality of metallic string wrapped around the third set of magnets contained within the battery that is adapted to produce electrical energy and a pair of copper plates placed outside of the first pair of magnets placed outside of the horizontal casing, the pair of copper plates is adapted to provide additional magnetic attraction between the first pair of magnets and the second pair of magnets.

Another embodiment of the gravity energy generator includes a horizontal casing having an interior housing within the horizontal casing, the interior housing having a first end, a second end and an interior, a plurality of magnets including a first pair of magnets and a second centered magnet, wherein one of the first pair of magnets are each placed on the first end and the second end within the interior of the interior housing, the first pair of magnets is adapted to exert electromagnetic pressure on the second centered magnet to rotate the second centered magnet in an intended direction, thereby producing electrical energy and a pair of magnetic push and pull devices positioned within the horizontal casing but outside the interior housing, the pair of magnetic push and pull devices is adapted to push and pull the first pair of magnets back and forth within the interior housing.

It is an object of the present invention to provide a gravity energy generator that provides a better and efficient way to use electricity as a source of power.

It is an object of the present invention to provide a gravity energy generator that is similar to how a motor is utilized with today's technology, but is relatively stronger and better.

It is an object of the present invention to provide a gravity energy generator that will work like a motor but instead of putting electricity through motion, it will be wiring and magnets tied together which may be pulled back and forth in gravity.

It is an object of the present invention to provide a gravity energy generator that will be made of relatively strong magnets and wiring.

It is an object of the present invention to provide a gravity energy generator that may be utilized with any sized generator or motor.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention however the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
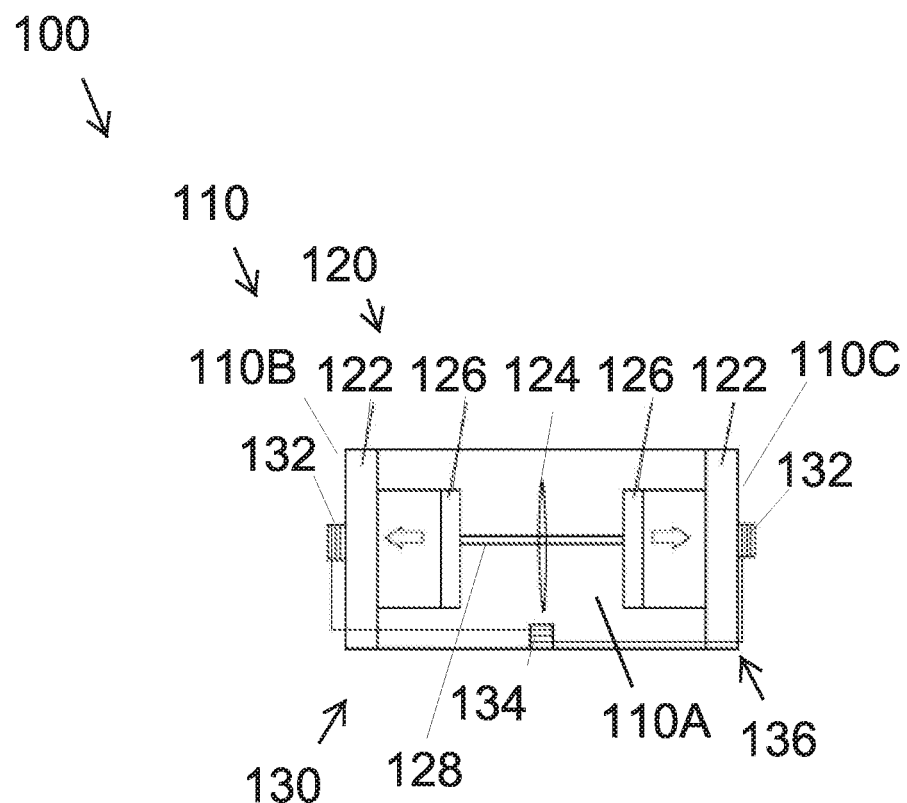
FIG. 1 illustrates an open side view of a first gravity energy generator, in accordance with one embodiment of the present invention.

FIG. 1 illustrates an open side view of a first gravity energy generator 100, in accordance with one embodiment of the present invention.

The first gravity energy generator 100 may include a horizontal casing 110, a plurality of magnets 120 and a plurality of wiring 130.

The horizontal casing 110 may include an interior 110A, a first end 110B and a second end 110C. The magnets 120 may include a first pair of magnets 122, a second magnet 124 and a third pair of magnets 126. Each of the first pair of magnets 122 may be placed on the first end 110B and the second end 110C within the interior 110A of the horizontal casing 110. The second magnet 124 may be positioned on a midpoint 128A of a centered shaft 128 that is adapted to rotate along the centered shaft 128 from an electromagnetic field from the first pair of magnets 122 placed on the first end 110B and the second end 110C within the interior 110A of the horizontal casing 110. The first pair of magnets 122 on the first end 110B and the second end 110C within the interior 110A of the horizontal casing 110 may be adapted to be attracted to and be in contact with the third pair of magnets 126. The wiring 130 may be in contact with an electrical contact 132 placed and centered outside of the first end 110B and the second end 110C of the horizontal casing 110 and are coupled to a third electrical contact 134, forming a single circuit 136. The wiring 130 may be made of copper or other suitable material.

Figure 2:
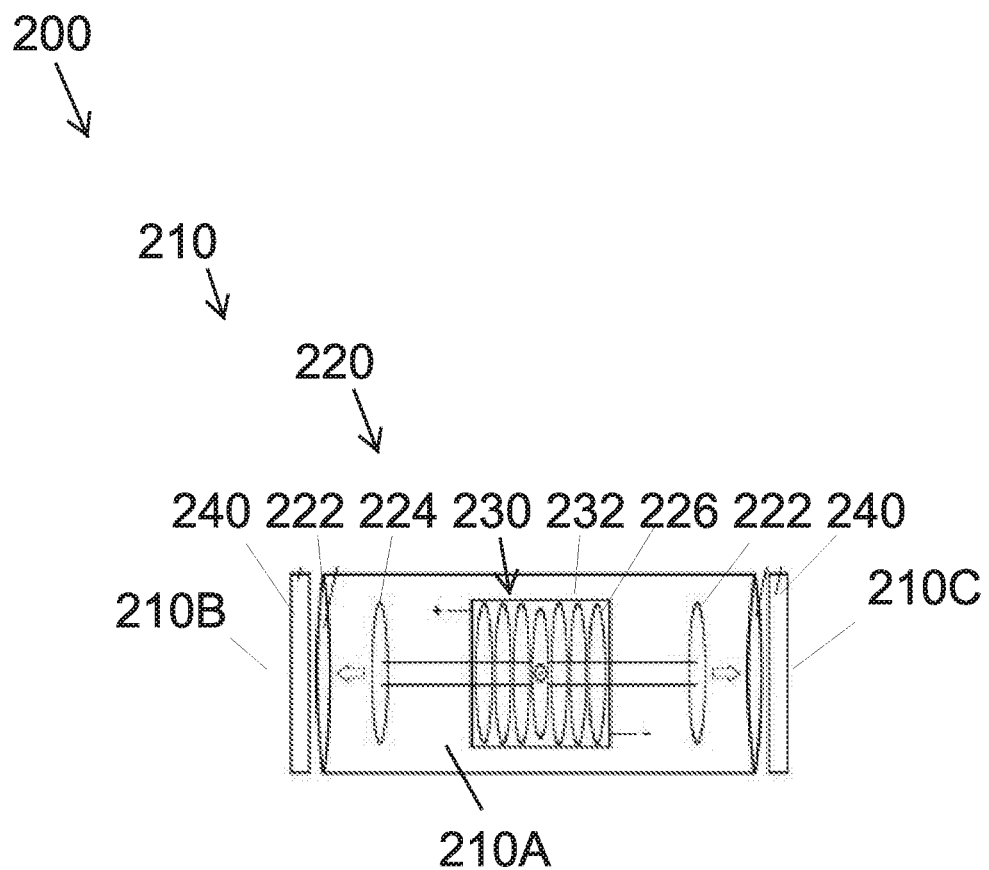
FIG. 2 illustrates an open side view of a second gravity energy generator, in accordance with one embodiment of the present invention.

FIG. 2 illustrates an open side view of a second gravity energy generator 200, in accordance with one embodiment of the present invention.

The second gravity energy generator 200 may include a horizontal casing 210, a plurality of magnets 220, a battery 230 and a pair of copper plates 240.

The horizontal casing 210 may include an interior 210A, a first end 210B and a second end 210C. The magnets 220 may include a first pair of magnets 222, a second pair of magnets 224 and a third set of magnets 226. One of the first pair of magnets 222 may be placed on the first end 210B and the other of the first pair of magnets 222 may be placed on the second end 210C within the interior 210A of the horizontal casing 210. One of the second pair of magnets 224 may be positioned in front of each of the first pair of magnets 222 and is adapted to be attracted to the first pair of magnets 222. The battery 230 may be positioned between the second pair of magnets 224. The battery 230 may include a plurality of metallic string 232 wrapped around the third set of magnets 226 contained within the battery 230 that is adapted to produce electrical energy. The metallic string 232 is made of copper or other similar material. The pair of copper plates 240 may each be placed outside of the first pair of magnets 222 placed outside of the horizontal casing 210. The pair of copper plates 240 may be adapted to provide additional magnetic attraction between the first pair of magnets 222 and the second pair of magnets 224.

Figure 3:
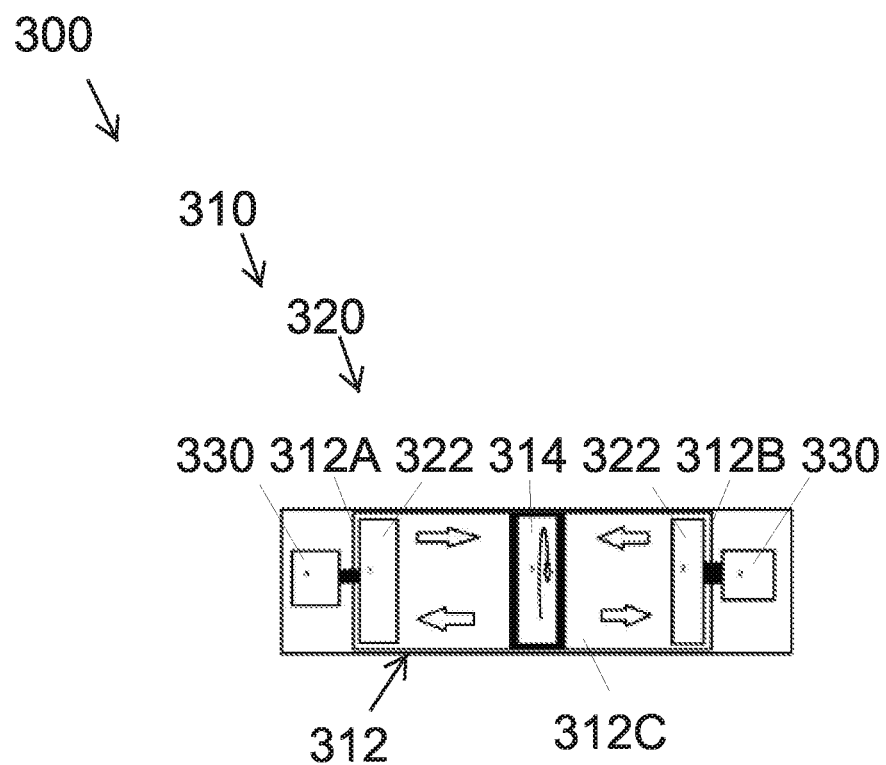
FIG. 3 illustrates an open side view of a third gravity energy generator, in accordance with one embodiment of the present invention.

FIG. 3 illustrates an open side view of a third gravity energy generator 300, in accordance with one embodiment of the present invention.

The third gravity energy generator 300 may include a horizontal casing 310, a plurality of magnets 320 and a pair of magnetic push and pull devices 330.

The horizontal casing 310 may have an interior housing 312 within the horizontal casing 310. The interior housing 312 may have a first end 312A, a second end 312B and an interior 312C. The magnets 320 may include a first pair of magnets 322 and a second centered magnet 314. One of the first pair of magnets 322 may be each placed on the first end 312A and the second end 312B within the interior 312C of the interior housing 312. The first pair of magnets 322 may be adapted to exert electromagnetic pressure on the second centered magnet 314 to rotate the second centered magnet 314 in an intended direction, thereby producing electrical energy. The pair of magnetic push and pull devices 330 may be positioned within the horizontal casing 310 but outside the interior housing 312. The pair of magnetic push and pull devices 330 may push and pull the first pair of magnets 322 back and forth within the interior housing 312.

While the present invention has been related in terms of the foregoing embodiments those skilled in the art will recognize that the invention is not limited to the embodiments described. The present invention may be practiced with modification and alteration within the spirit and scope of the appended claims. Thus, the description is to be regarded as illustrative instead of restrictive on the present invention.

What is claimed is:

1. A gravity energy generator, comprising:
   a horizontal casing having an interior, a first end and a second end;
   a plurality of magnets including a first pair of magnets, a second magnet and a third pair of magnets, the first pair of magnets are placed on the first end and the second end within the interior of the horizontal casing, the second magnet is positioned on a midpoint of a centered shaft that is adapted to rotate along the centered shaft from an electromagnetic field from the first pair of magnets placed on the first end and the second end within the interior of the horizontal casing and the first pair of magnets on the first end and the second end within the interior of the horizontal casing is adapted to be attracted to and is in contact with the third pair of magnets; and
   a plurality of wiring in contact with an electrical contact placed and centered outside of the first end and the second end of the horizontal casing, which is coupled to a third electrical contact, forming a single circuit.

2. The gravity energy generator according to claim 1, wherein the wiring is made of copper.

3. A gravity energy generator, comprising:
   a horizontal casing having an interior, a first end and a second end;
   a plurality of magnets including a first pair of magnets, a second pair of magnets and a third set of magnets, wherein one of the first pair of magnets are each placed on the first end and the second end within the interior of the horizontal casing, wherein one of the second pair of magnets are positioned in front of the first pair of magnets and is adapted to be attracted to the first pair of magnets;
   a battery positioned between the second pair of magnets, the battery includes a plurality of metallic string wrapped around the third set of magnets contained within the battery that is adapted to produce electrical energy; and
   a pair of copper plates placed outside of the first pair of magnets placed outside of the horizontal casing, the pair of copper plates is adapted to provide additional magnetic attraction between the first pair of magnets and the second pair of magnets.

4. The gravity energy generator according to claim 3, wherein the metallic string is made of copper.

* * * * *